United States Patent [19]

Hattori et al.

[11] Patent Number: 4,832,173
[45] Date of Patent: May 23, 1989

[54] DEVICE FOR ROTATING CONTAINERS WHILE TRANSPORTING SAME

[75] Inventors: Masahiro Hattori; Yasuyuki Nanba, both of Tokyo, Japan

[73] Assignee: Kirin Beer Kabushiki Kaisha, Tokyo, Japan

[21] Appl. No.: 867,787

[22] Filed: May 27, 1986

[30] Foreign Application Priority Data

May 31, 1985 [JP] Japan .............................. 60-117827
Apr. 16, 1986 [JP] Japan ................................ 61-87293

[51] Int. Cl.⁴ ............................................. B65G 17/48
[52] U.S. Cl. .................................. 198/377; 198/410; 198/413; 198/415; 198/416
[58] Field of Search ................ 198/375, 377, 410–413, 198/415, 416, 394, 395

[56] References Cited

U.S. PATENT DOCUMENTS

| | | | |
|---|---|---|---|
| 2,487,354 | 11/1949 | McNamara et al. | 198/377 |
| 2,830,462 | 4/1958 | Vettese | 198/377 X |
| 2,928,222 | 3/1960 | Lindstaedt | 198/377 X |
| 3,216,550 | 11/1965 | Cox | 198/377 |
| 3,612,254 | 10/1971 | Wideman | 198/377 X |
| 3,842,973 | 10/1974 | Rothert | 198/377 |
| 4,096,937 | 6/1978 | Wallace | 198/377 |
| 4,511,025 | 4/1985 | Nakayama | 198/377 |

FOREIGN PATENT DOCUMENTS

| | | | |
|---|---|---|---|
| 2903470 | 8/1980 | Fed. Rep. of Germany | 198/375 |
| 2529177 | 12/1983 | France | 198/377 |
| 2096556 | 10/1982 | United Kingdom | 198/377 |

Primary Examiner—Robert J. Spar
Assistant Examiner—Lyle K. Kimms
Attorney, Agent, or Firm—Ladas & Parry

[57] ABSTRACT

A container rotating-transporting device for transporting a plurality of containers while rotating same, which comprises a transport device for transporting the containers straightly, a plurality of container stands each provided rotatably on the transport device to hold a container thereon and having a roller or pulley and a rotation imparting member for rotating each container stand when the roller or pulley contacts the rotation imparting member. This device is used for a container inspecting device.

8 Claims, 8 Drawing Sheets 4,832,173

DEVICE FOR ROTATING CONTAINERS WHILE TRANSPORTING SAME

BACKGROUND OF THE INVENTION

The present invention relates to a device for rotating a container such as a bottle, can or the like while transporting the same rectilinearly which is best adapted for use with a bottle inspection device or the like.

In general, in a bottle inspection device for inspecting the whole surface of each bottle, each bottle is revolved along a circular path while it is rotated about its axis when passing through an inspection zone. In the inspection zone, a light source and a camera are used to inspect flaws and foreign matters of each bottle.

An example of a device for rotating bottles while they are transported will be described with reference to Japanese Laid-Open Utility Model No. 53099/1983. Such device is used with a bottle inspection device and comprises a turntable with a supporting shaft coupled through a reduction gear to a motor. The outer periphery of the turntable is formed with a plurality of supporting mechanism for supporting bottles. Each supporting mechanism includes a cylindrical support with a pulley attached to the lower end thereof. An endless travelling belt is disposed along the path of each supporting mechanism within an inspecting region of the bottle inspection device. When each supporting mechanism passes through the inspecting region, it is rotated about its axis because the pulley of each support is brought into contact with the endless travelling belt.

The upper portion of the support is diverged upwardly to form an enlarged head portion. A suction cup for sucking and holding a bottle is disposed within the enlarged head portion and is communicated with a vacuum pump. As the vacuum pump is operated, the elastic deformations of the peripheral surface of the suction cup occur so that the suction cup is brought into intimate contact with the bottom of a bottle, whereby the bottle is held on the surface of the support in a stable manner.

However, in the device of the type described above, as the bottles are revolved along a circular path, a centrifugal force is exerted to each bottle and consequently the bottles tend to fall down radially outwardly. As a result, in order to prevent the radial outward fall of the bottles there must be provided the suction cups for sucking and holding the bottles, a vacuum pump as a negative pressure source for supplying a negative pressure to the suction cups and electromagnetic valves. Therefore, the device itself becomes very complex in construction and furthermore since a large number of component parts are required, the device becomes very expensive.

In addition, in the inspection zone, a light source and a camera are so disposed that a bottle to be inspected passes between them. The camera must be mounted on the turntable, which has no sufficient installation space, in such a way that the rotation of the turntable is not transmitted to the camera. Therefore it is difficult to mount a plurality of cameras on the turntable. Accordingly, only one camera is normally mounted. However, when only one inspection camera is mounted, its field of view is limited and a bottle to be inspected must be rotated once (through 360 degrees about its axis) in a narrow field of view of the inspection camera. As a consequence, the rotational speed of the bottle supporting mechanism must be increased considerably so that the whole surface inspection of the bottles cannot be accomplished in a satisfactory manner.

Moreover, there is a problem that when the shape and size of the bottles and their bottoms are varied, the suction cups cannot suck and securely hold the bottles.

SUMMARY OF THE INVENTION

The present invention was made in order to overcome the above and other problems encountered in the conventional devices for rotating and transporting containers and has for its object to provide a device which can rotate a bottle container or the like while the latter is transported rectilinearly and which is very simple in construction.

According to this invention, there is provided a container rotating-transporting device for transporting a plurality of containers such as bottles, cans and the like in a line while rotating same for inspection and other purposes, which comprises: transport means for transporting straightly the containers in a line; a plurality of container stands upon each of which a container is placed and which are rotatably held on the transport means at a predetermined space interval; rotating body means connected to each container stand; and rotation imparting means disposed along the transport means within a predetermined distance in order to rotate each container stand when the rotating body means of each container stand contacts the rotation imparting means.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
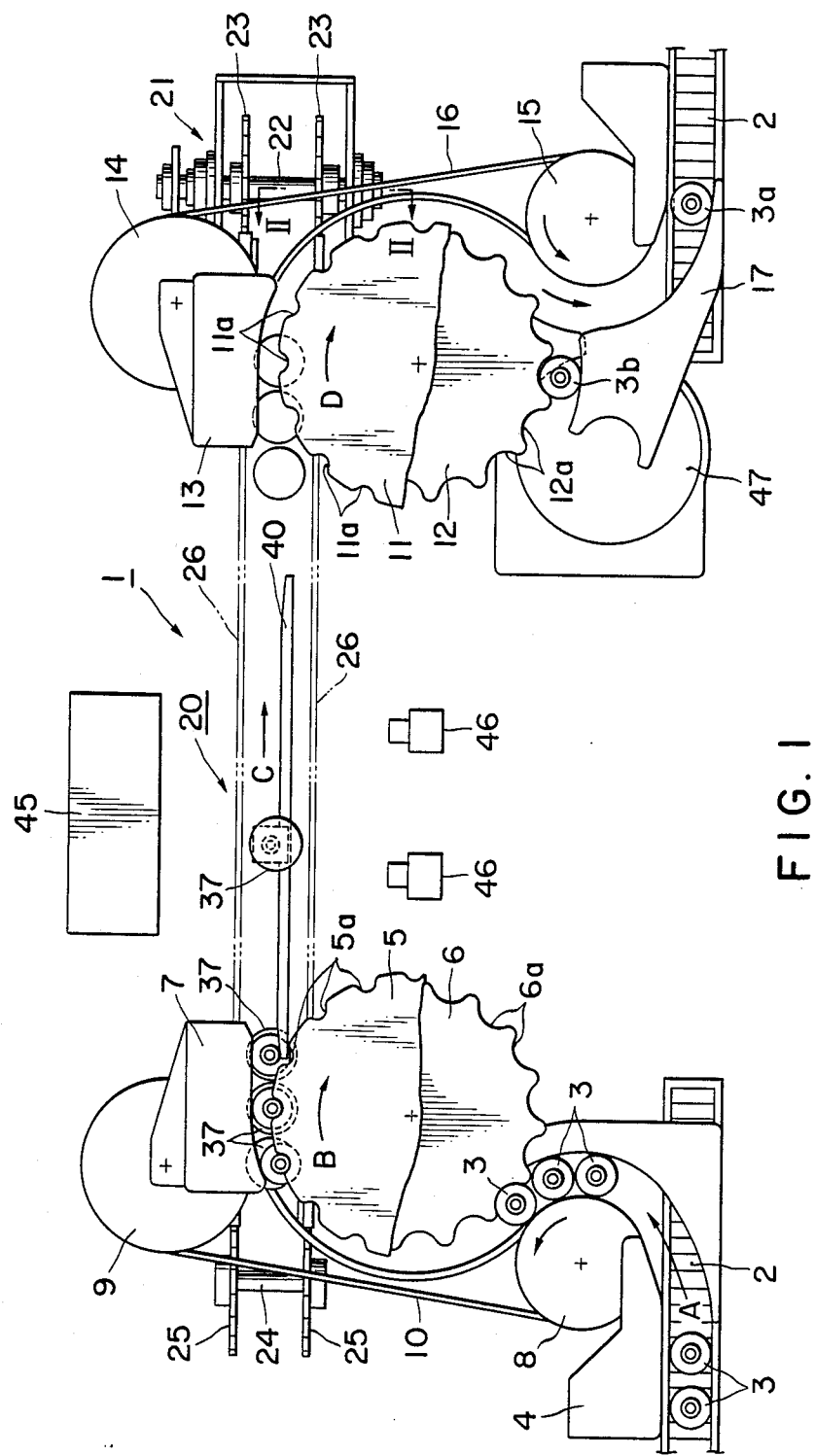
FIG. 1 is a top view of a first preferred embodiment of a container rotating-transporting device in accordance with the present invention.

With reference to FIGS. 1-4, a first preferred embodiment of the present invention will be described. FIG. 1 is a top view of a bottle inspection device generally designated by the reference numeral 1 and a plurality of bottles 3 are transported in a line to the bottle inspection device 1 by means of a conveyor 2. A guide 4 is disposed on the upstream side of the bottle inspection device 1 so as to guide the bottles 3 toward two star wheels 5 and 6 disposed vertically spaced apart from each other.

The star wheels 5 and 6 are rotatably carried by the same shaft and the star wheel 5 (the upper one in FIG. 1) has a plurality of receiving recesses 5a around its whole periphery for engagement with the neck portions of the bottles 3 while the star wheel 6 (the lower one in FIG. 1) has a plurality of receiving receses 6a around its whole periphery for engagement with the cylindrical portions of the bottles 3. A guide 7 is disposed on the discharge side of the star wheels 5 and 6 so as to continuously place the bottles 3 upon bottle stands 37 of a rotating-transporting device 20.

Pulleys 8 and 9 are rotatably disposed adjacent to the star wheels 5 and 6. An elastic endless spring belt 10 is provided between the pulleys 8 and 9 and is brought into contact with the cylindrical portions (bodies) of the bottles 3 so as to press the latter against the star wheels 5 and 6.

Star wheels 11 and 12 are disposed in opposed and spaced apart relationship with the star wheels 5 and 6 and are substantially similar in construction to the star wheels 5 and 6. The star wheels 11 and 12 are rotatably carried by the same shaft and the star wheel 11 (the upper one in FIG. 1) has a plurality of receiving recesses 11a around its whole periphery for engagement with the neck portions of the bottle containers 3 while the star wheel 12 has a plurality of receiving rececces 12a around its whole periphery for engagement with the cylindrical portions of the bottle containers 3. A guide 13 is disposed adjacent to the star wheels 11 and 12 and pulleys 14 and 15 are disposed also adjacent to the star wheels 11 and 12. An endless spring belt 16 is disposed between the pulles 14 and 15. A guide 17 is disposed adjacent to the pulley 15 so as to transfer normal or flawless bottles 3a onto the bottle conveyor belt 2 in the manner to be described below. A turntable 47 is disposed below the guide 17 and defective bottles 3b are transferred onto the turntable 47 and then transported by another conveyor (not shown) to a predetermined storage space.

The container rotating-transporting device 20 is disposed between the star wheels 5 and 6 on the one side and the star wheels 11 and 12 on the other side. The device 20 comprises a plurality of bottle stands 37 upon each of which is placed one of the bottles and which are rotatably held on a transport device 21 at a predetermined space interval. The transport device 31 moves straightly. Along the transport devcie 21 is provided a rotation-imparting rail 40 whose upstream end is close to the periphery of the wheel 6.

Figure 2:
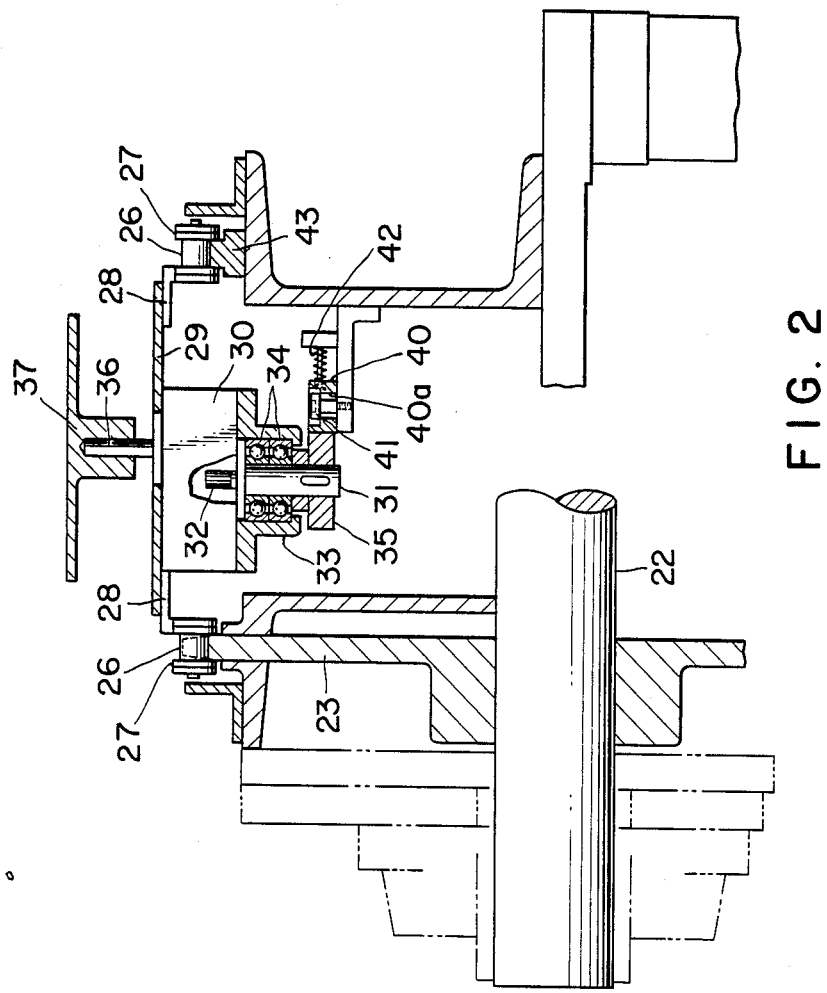
FIG. 2 is a sectional view taken along the line II—II of FIG. 1.
Figure 3:
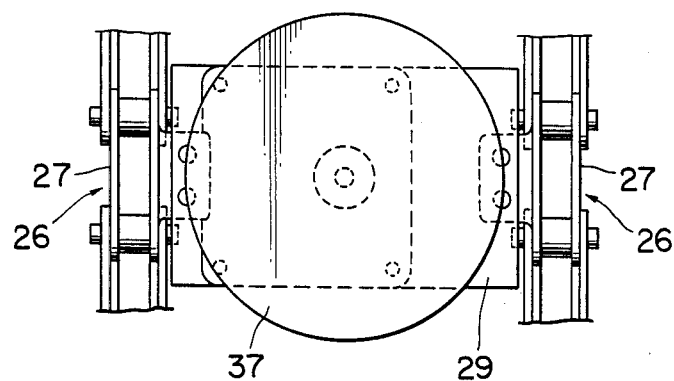
FIG. 3 is a fragmentary view, on enlarged scale, of FIG. 2.
Figure 4:
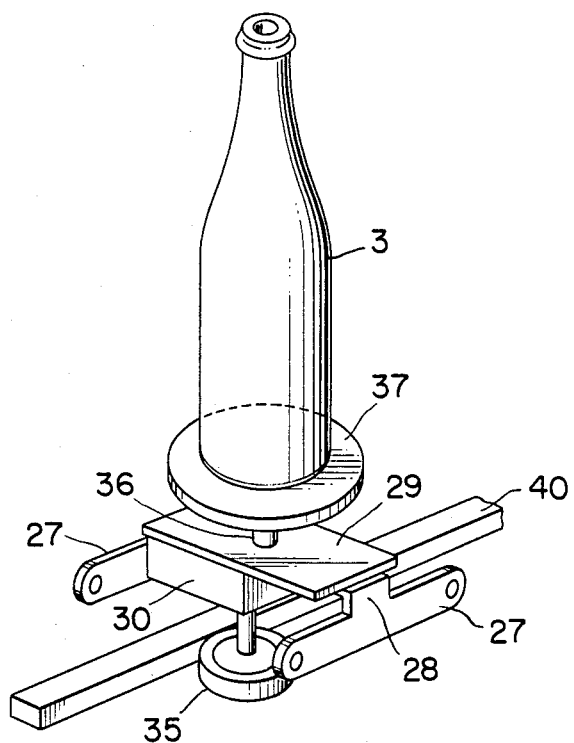
FIG. 4 is a fragmentary perspective view, on enlarged scale, of the first preferred embodiment as shown in FIG. 1.

The transport device 21 has a main rotating shaft 22 carrying two sprocket wheels 23, 23. A rotating shaft 24 which is spaced apart from the main rotating shaft 22 by a predetermined distance also carries to sprocket wheels 25, 25. Two parallel endless chains 26, 26 are disposed between the respective sprocket wheels 23, 23 and 25, 25. The main rotating shaft 22 is coupled to a driving motor (not shown) so that the roller chains 26 are driven. As best shown in FIG. 2 and 3, an L-shaped member 28 is securely attached to each link 27 of each roller chain 26 and a supporting plate 29 is securely mounted on two L-shaped members 28, 28 on its opposite sides. A reduction gear 30 for varying the rotation speed of the bottle stands 37 is attached to the supporting plate 29. A gear 32 formed integral with an input shaft 31 is in mesh with a gear (not shown) of the reduction gear 30. The input shaft 31 is rotatably supported by a bearing 34 disposed within a bearing box 33. A roller 35 as a rotating body is made of a plastic or resin such as urethane rubber. The roller 35 is in the form of a cylinder and is attached to the input shaft 31. An output shaft 36 of the reduction gear 30 is extended upwardly through a hole formed in the supporting plate 29 and the disk-shaped bottle-stand 37 is mounted at the upper end of the output shaft 36. The upper surface of the stand 37 is formed with radial grooves or bonded with a rubber plate so as to prevent the slippage of the bottle 3 placed on the stand 37. Therefore, even when the stand 37 is rotated at a high rotational speed, the bottle 3 thereon can be transported in a stable manner.

The rail 40 is extended along the two roller chains 26 by a predetermined distance and is made of, for instance, spring steel. As shown in FIG. 1, both the end portions of the rail 40 are tapered 20 as to ensure the smooth contact of the roller 35 and the rail 40. The rail 40 is formed with a predetermined number of holes 40a each having a diameter slightly larger than that of a screw 41 which is inserted into each hole 40a. The rail 40 is urged toward a path of the rollers 35 by a plurality of compression coil springs 42 to be normally brought into contact with each roller 35. As best shown in FIG. 2, the chains 26 are adapted to be guided by a predetermined distance by means of two chain rails 43, 43 respectively.

The mode of operation of the container rotating-transporting device 20 with the above-described construction will be described. The bottles 3 are sequentially transported in a line to the bottle inspection device 1 by the bottle conveyor 2 which is driven in the direction indicated by an arrow A and then guided toward the star wheels 5 and 6 by the guide member 4. Then the neck portion of each bottle 3 is brought into engagement with the receiving recess 5a of the star wheel 5 while the cylindrical portion of the bottle 3 is brought into engagement with the receiving recess 6a of the star wheel 6. Thus, the bottle 3 is revolved as the star wheels 5 and 6 are rotated in the direction indicated by an arrow B. In this case, each bottle 3 is pressed against the star wheels 5 and 6 by the spring belt 10 which is driven in synchronism with the peripheral speed of the star wheels 5 and 6 (or which is moved in contact with the bottle container 3 without any driving means. Each bottle 3 discharged out of the star wheels 5 and 6 is guided by the guide member 7 to be placed upon each container stand 37 of the container rotating-transporting device 20.

As the roller chains 26 are driven, the container stands 37 are transported in a line in the direction indicated by an arrow C in FIG. 1 and the roller 35 of each stand 37 is brought into contact with the rail 40. Then the roller 35 rotates along the rail 40 and the rotational speed of the roller 35 is reduced by the reduction gear 30 so that the container stand 37 rotates at a predetermined rotational speed. Therefore, the length of the rail 40 is so selected that the rail 40 causes just one rotation of the bottle 3. While each bottle 3 makes one rotation, it is inspected by a light source 45 and cameras 46 disposed on the opposite sides of the transport device 21. The non-defective bottle containers 3a are transported by the star wheels 11 and 12, which rotate in the direction indicated by an arrow D, and transferred through the guide 17 onto the conveyor 2. On the other hand, defective bottle containers 3b are held by each suction cup (not shown) disposed on the star wheels 11 and 12 and placed onto the turntable 47.

A modification of the first preferred embodiment described above with reference to FIGS. 1 through 4 will be explained.

Figure 5:
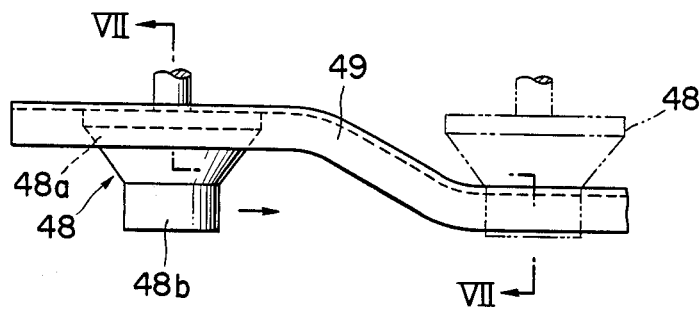
FIG. 5 is a front view of a modification of a rotation imparting rail in the first embodiment as shown in FIGS. 1 through 4.
Figure 6:
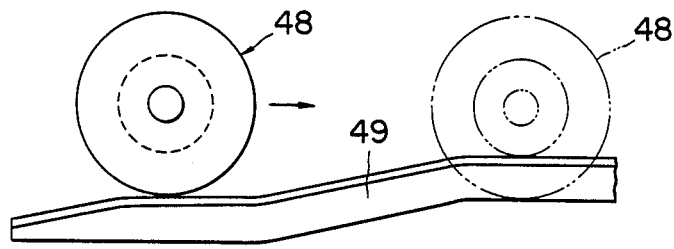
FIG. 6 is a top view thereof.
Figure 7:
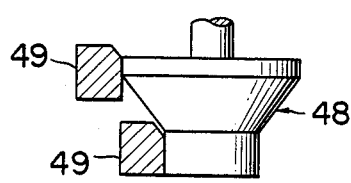
FIG. 7 is a sectional view taken along the line VII—VII of FIG. 5.

Referring now to FIGS. 5 through 7, a reference numeral 48 designates a roller substantially in the form of a frustum of a cone. A rotation-imparting rail 49 which contacts the roller 48 is extended in such a way that it is inclined downwardly from the upstream side to the downstream side and consequently it is brought into contact with the larger diameter portion to the smaller diameter portion of the roller 48 gradually. As a result, when the roller 48 is first brought into contact with the rail 49, the rotational speed of the bottle stand 37 is slow, but the rotational speed thereof is gradually increased and then maintained at a predetermined rotational speed while each bottle stand 37 is transported straightly.

Figure 8:
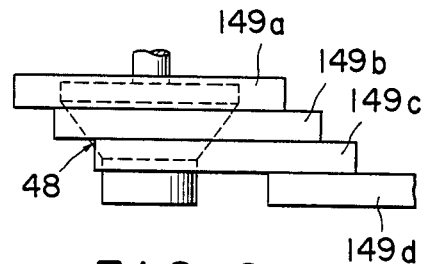
FIG. 8 is a front view of another modification of the first embodiment.
Figure 9:
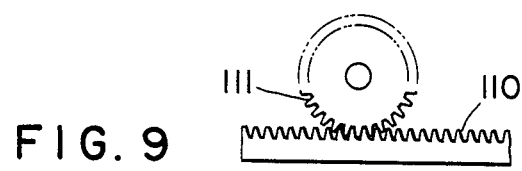
FIG. 9 is a top view of still another modification of the first embodiment.

In the above-described modificatin, in case that only one rail 49 is provided, the rail 49 must be bent on its upstream side in a complex manner as shown in FIGS. 5 and 6. Consequently, it is difficult to fabricate the rail 49. Therefore, a plurality of straight rails 149a, 149b, 149c, and 149d may be extended in a step manner in the vertical direction so that the rotational speed of roller 48 becomes large gradually as shown in FIG. 8.

Referring back to FIGS. 1 through 4, instead of the cylindrical roller 35, a pinion 11 may be used while instead of the rail 40, a rack 110 may be used. In this case, the pinion 111 rotates on the rack 110, so that each bottle stand 37 is rotated while it is straightly transported.

Figure 10:
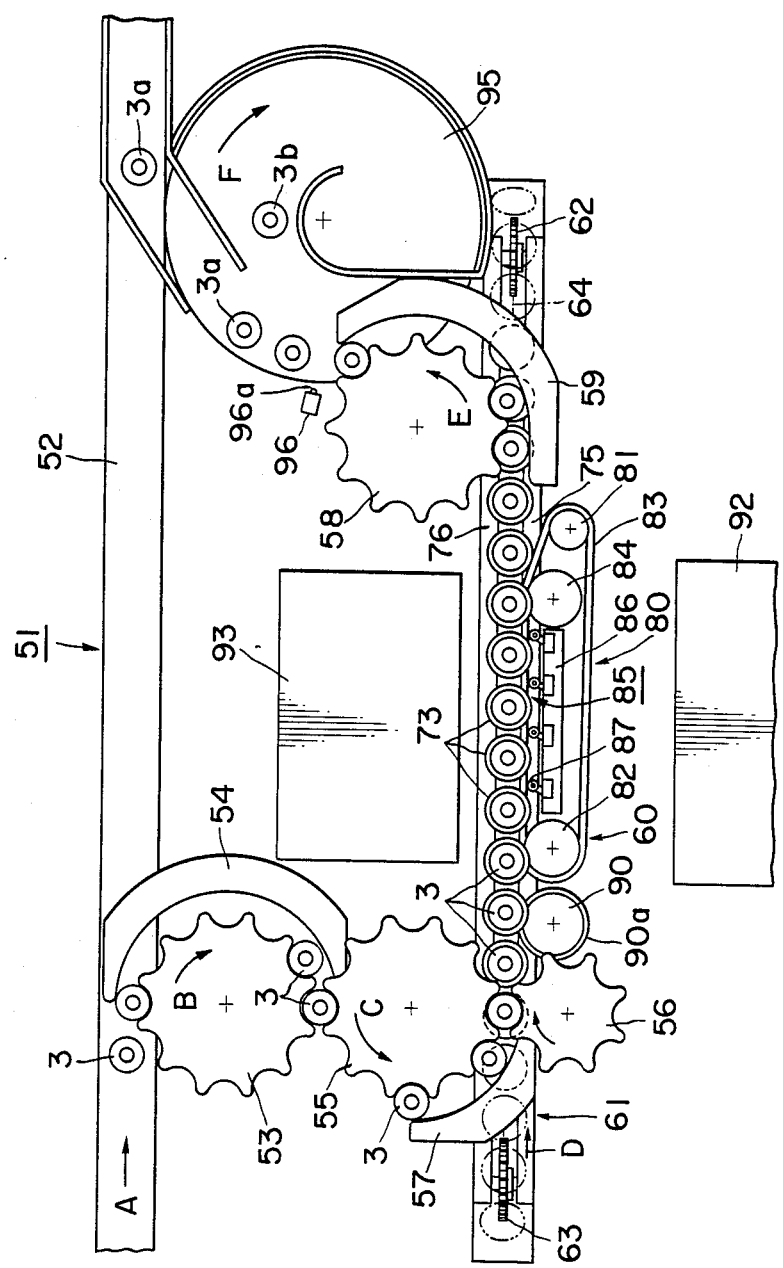
FIG. 10 is a top view of a second preferred embodiment of the present invention.

Referring to FIGS. 10 through 14, a second preferred embodiment of the present invention will be described. FIG. 10 is a top view of a bottle inspection device 51 and a plurality of bottles 3 are transferred to the bottle inspection device 51 by a bottle container transportation conveyor 52. An inlet star wheel 53 is disposed on the upstream side of the bottle inspection device 51 and an inlet guide 54 is disposed along the star wheel 53 so as to guide the bottles 3 toward an adjacent main star wheel 55. An auxiliary star wheel 56 and a main guide 57 are disposed adjacent to and in opposed relationship with the main star wheel 55. An output star wheel 58 is disposed in opposed and spaced apart relationship with the main star wheel 55 and an outlet guide 59 is disposed along the outlet star wheel 58.

A container rotating-transporting device 60 is disposed between the main star wheel 55 and the outlet star wheel 58. The device 60 comprises a plurality of bottle stands 73 upon which are placed the bottles, respectively. A transport device 61 holds the container stands 73 and transporting them straightly. A rotation-imparting means 80 comprises a travelling belt 83 which is extended by a predetermined distance in the direction in which are transported the bottle stands 73. Each stand 73 is supported by a pulley 70 as rotating body means (FIGS. 11 and 12).

Figure 11:
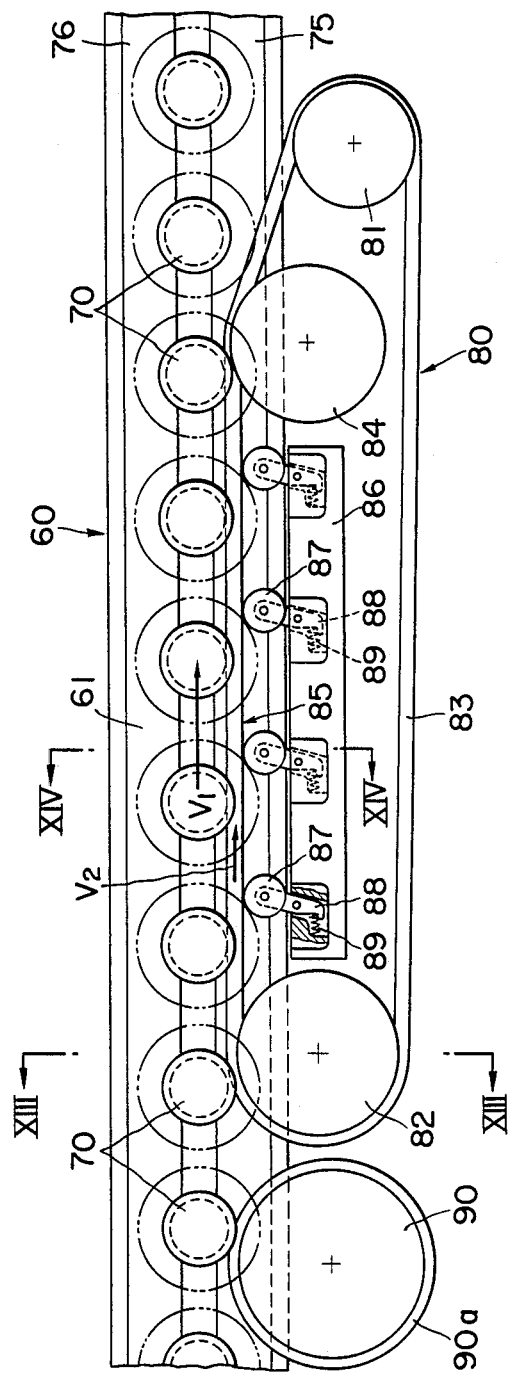
FIG. 11 is a sectional view, on enlarged scale, thereof.
Figure 12:
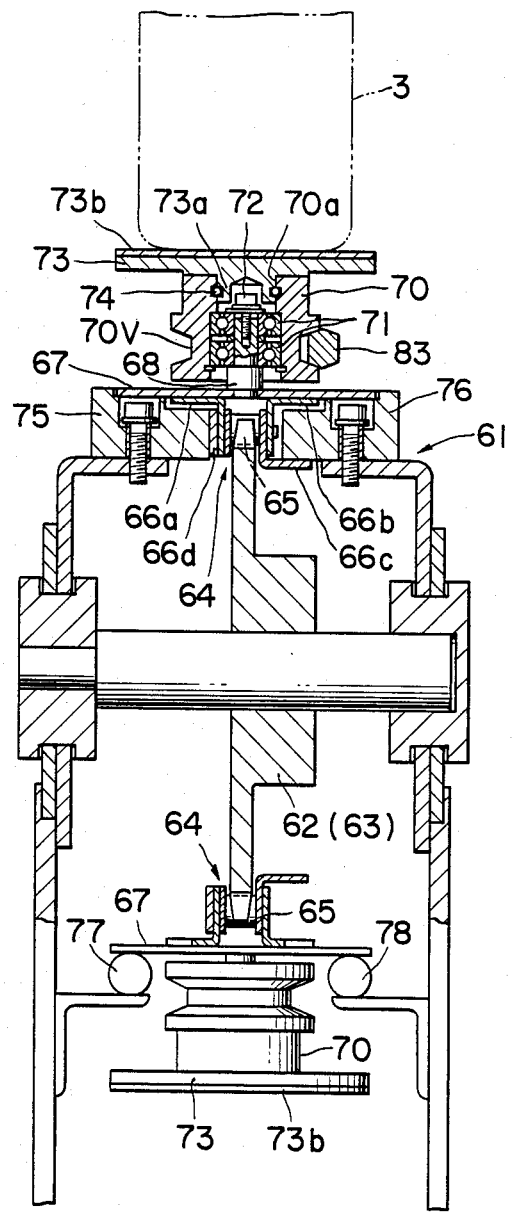
FIG. 12 is a fragmentary view, on enlarged scale, thereof.
Figure 13:
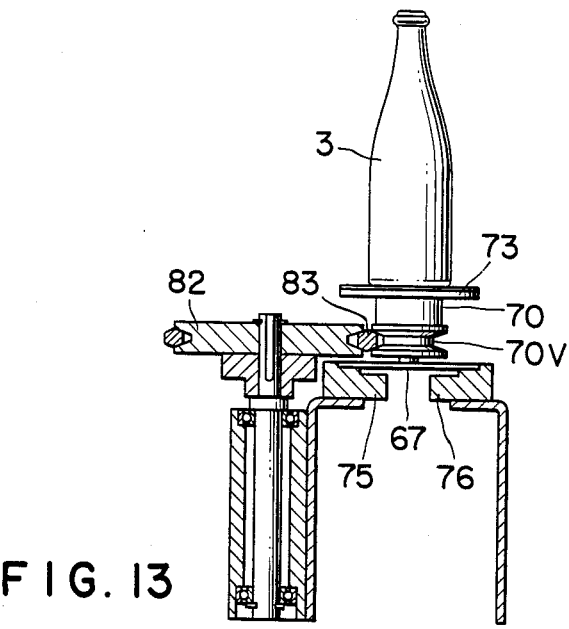
FIG. 13 is a sectional view taken along the line XIII—XIII of FIG. 11.
Figure 14:
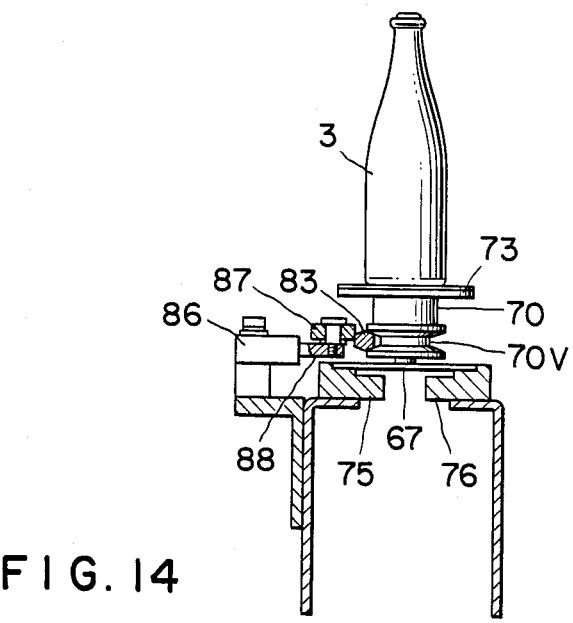
FIG. 14 is a sectional view taken along the line XIV—XIV of FIG. 11.

As shown in FIGS. 10 through 12, the transport device 61 of the container rotating-transporting device 60 has a driving sprocket wheel 62 and a driven sprocket wheel 63 which are spaced apart from each other by a predetermined distance. An endless chain 64 is provided between the driving and driven sprocket wheels 62 and 63 and is driven by a driving motor (not shown) coupled to the rotating shaft of the driving sprocket wheel 62. Plate-like plastic guide rails 75 and 76 are extended on the opposite sides of the upper run of the roller chain 64 while two rod-shaped guide rails 77 and 78 are extended on the opposite sides of the lower run of the roller chain 64 (See FIG. 12).

As best shown in FIG. 12, a plurality of L-shaped members 66a, 66b and 66c are securely attached to each of links 65 of the roller chain 64. A supporting plate 67 is securely mounted on the members 66a and 66b. A plurality of supporting shafts 68 are securely attached to the center of each of the supportin plates 67. A stand pulley 70 as rotating body means having a V-shaped groove 70V is rotatably carried through bearings 71 by each supporting shaft 68. A bearngs 71 is securely fixed to the supporting shaft 68 having a hexagonal hole by means of a bolt 72.

Each bottle stand 73 is detachably attached to the upper surface of the bottle stand pulley 70 in such a way that a downwardly extended bottom portion 73a of the bottle stand 73 is fitted into the opening 70a of the stand pulley 70 and an O-ring 74 is interposed between them. Therefore, the bottle stand pulley 70 and the bottle stand 73 are brought into frictional engagement with each other so that they rotate in unison. A rubber plate or the like 73b is bonded to the upper surface of the stand 73 to prevent the slippage of the bottle 3, so that it becomes possible to transport it in a stable manner even at a high rotational speed.

Upon rotation of the driving sprocket wheel 62 of the transport device 51, the roller chain 64 is driven so that the container stands 73 connected to the links of the roller chain 64 are transported. In this case, in the upper run of the roller chain 64, each container stand 73 is guided horizontally while the lower surface of the supporting plate 67 is made into sliding contact with the upper surfaces of the stationary plate-like guide rails 75 and 76, the upper surface of the stationary member 66c is brought into slidable contact with the lower surface of the plate-like guide rail 76 and the side surface of the plate-like guide rail 75 is made into slidable contact with a side plate 66d disposed on the side surface of the stationary member 66a. In the lower run of the roller chain 64 each container stand 73 is guided while the rod-shaped guide rails 77 and 78 are made into slidable contact with each supporting plate 67.

A rotation-imparting means 80 as a rotationimparting means is disposed along the transport device 61 and comprises a driving pulley 81 directly coupled to a variable speed motor, a driven pulley 82 and an endless belt 83 hexagonal in cross section are provided between the driving and driven pulleys 81 and 82. The tension of the travelling belt 83 is controlled by a tension pulley 84. The travelling belt 83 is adapted to engage with the V-shaped groove 70V of each stand pulley 70 of the inner run 85 of the belt 83 thereby to rotate each stand pulley 70. As best shown in FIGS. 10 and 11, a roller supporting plate 86 is disposed along the inner run 85. Four swinging arms 88 each having a pressure roller 87 at its outer end are pivotally connected to the roller supporting plate 86 and are spaced apart form each other by a predetermined distance. The inner end of each swinging arm 88 is connected to a compression coil spring 89 so that each roller 87 is pushed outside. As a result, the travelling belt 83 is securely engaged with the stand pulleys 70 so that the variations in rotational speed of the container stands 73 are prevented. A previous rotation-imparting pulley 90 is disposed on the upstream side of the transport device 61 and adjacent to the driven pulley 82. The pulley 90 has a rubber ring 90a around the periphery thereof. The ring 90a engages with the V-shaped groove 70V of each stand pulleys 70 so that each stand pulley 70 and stand 73 are rotated previously at an upstream position of the rotationimparting means 80.

A camera 92 and a light source 93 are disposed on the opposite sides, respectively, of the transport device 61 and the rotation-imparting means 80 so that each bottle 3 which passes in front of the camera 92 is inspected. A turntable 95 for discharging or rejecting the defective bottles is disposed adjacent to the outlet star wheel 58 and defective bottles are discharged into the turntable 95 by a rejection device 96 having an air nozzle 96a disposed adjacent to the outer periphery of the turntable 95. On the other hand, a non-defective bottle 3a is returned along the outer periphery of the turntable 95 onto the bottle transportation conveyor 51 through a guide path and transported to the next station or the like.

The mode of operation of the second preferred embodiment with the above-described construction will be described in detail hereinafter.

As shown in FIG. 11, the driving direction of the transport device 61 and the inner run 85 of the travelling belt 83 are the same direction. In addition, the transport velocity $V_1$ of the transport device 61 is higher than the travelling velocity $V_3$ of the belt 83. Under these conditions, the bottles 3 are transported while being rotated simultaneously in accordance with the present invention.

Each bottle 3 is transported to the inlet star wheel 53 by the conveyor 51 which is driven in the direction indicated by an arrow A. Thereafter, the inlet star wheel 53 which is rotated in the direction indicated by an arrow B and the inlet guide 54 transport the bottle 3 toward the main star wheel 55. The bottle 3 is held by the main star wheel 55 which rotates in the direction indicated by an arrow C. In this case, the bottom of the bottle 3 is inspected. Next, each bottle 3 is placed on a respective bottle stand 73 of the transport device 61 by the main and auxiliary star wheels 55 and 56. As the roller chain 64 is driven, the stand 73 is transported in the direction indicated by an arrow D in FIG. 10. In this case, each stand pulley 70 connected to each container stand 73 is brought into contact with the previous rotation imparting pulley 90 so that the container stand 73 is moved forward, the travelling belt 83 of the rotation-imparting means 80 is brought into engagement with the V-shaped groove 70V of each stand pulley 70. Then, due to the difference ($V_1-V_2$) between the transporting velocity $V_1$ of the transport device 61 and the travelling velocity $V_2$ of the travelling belt 83, a rotational force is imparted to the stand pulley 70. Therefore, stand 73 is rotated at a predetermined velocity. Thus, while each bottle container 3 is straightly transported by the transport device 61, a rotational force is imparted to each stand 73 due to the difference in velocity between the transport device and the rotation-imparting means 80, whereby the bottle 3 is rotated at a predetermined velocity.

The transport device 61 and the rotation-imparting means 80 are so designed and constructed that more than one rotation is given to each bottle 3. While each bottle 3 is rotated in the manner described above, the bottle 3 is completely inspected by the camera 92 and the light source 93 disposed on the opposite sides, respectively, of the transport device 61 and the rotation-imparting means 80. The inspected bottle 3 is transported by the transport device 61 toward the outlet star wheel 58 which rotates in the direction indicated by an arrow E and which in turn transfers the inspected bottles 3 to the turntable 95 which is rotating in the direction indicated by an arrow F. While the inspected bottles 3 are moved along the outer periphery of the turntable 95, defective bottles 3b are discharged into the turntable 95 by the air ejected from the air nozzle 96a while non-defective bottles 3a are returned to the bottle conveyor 51. So far the velocity $V_1$ has been described as being faster than the velocity $V_2$, but it is to be understood that the bottle stand 73 and hence each bottle 3 are also rotated under the condition that $V_2$ is faster than $V_1$.

The motor for driving the driving pulley 81 of the rotation-imparting means 80 is variable of speed. Therefore, the travelling velocity $V_2$ of the travelling belt 83 can be selected so that the difference in velocity ($V_1-V_2$) between the transporting velocity $V_1$ of the transport device 61 and the travelling velocity $V_2$ of the belt 83 may be arbitrarily varied. As a result, the rotational speed of each container stand 73 can be arbitrarily selected from a low speed to a high speed. When the moving direction of the inner run 85 of the travelling belt 83 is opposite to the moving direction of the transport device 61, the rotational speed or force corresponding to $V_1+V_2$ is imparted to each stand 73.

As described above, according to the present invention, unlike the conventional container rotatingtransporting devices, it is not needed to revolve the bottles on a turntable, so that no centrifugal force is produced. As a result, the bottles can be securely held in position without the use of any means such as suction cups for securely holding each bottle. As a consequence, the container rotating-transporting device in accordance with the present invention is not needed to be provided with the suction cups and a negative pressure source. Therefore the container rotating-transporting device can be made simple in construction. As a result, the number of component parts can be minimized and consequently the fabrication cost can be reduced.

In addition, according to the present invention, each bottle is merely placed upon a bottle stand and no means for securely holding each bottle on the bottle stand is needed. As a result, the shape and size of the bottles can be arbitrarily selected. In other words, the container rotating-transporting device in accordance with the present invention makes it possible to inspect various types of containers such as elliptical bottles, square bottles, Japanese type sake bottles, cans and the like.

Furthermore, according to the present invention, the travelling belt is driven in the same direction as the container stands so that the containers are transported straightly and simultaneously rotated at a low rotational speed without any variation in rotational speed. Moreover, the rotational speed of the containers can be varied. Therefore, the whole surface inspection of each container can be accomplished completely. Moreover, as the containers are transported straightly, there may be provided a space for installing a plurality of inspection devices such as cameras and consequently the complete inspection of the containers becomes possible.

What is claimed is

1. A container rotating-transporting device for transporting a plurality of containers such as bottles, cans and the like in a line while rotating same for inspection and other purposes, which comprises:
   (a) transport means for transporting straightly the containers in a line;
   (b) a plurality of container stands upon each of which a container is placed and which are rotatablt held on the transport means at a predetermined space interval;
   (c) rotating body means connected to each container stand;
   (d) rotation imparting means disposed along the transport means within a predetermined distance in order to rotate each container stand when the rotating body means of each container stand contacts the rotation imparting means; and
   (e) previous rotation imparting means provided on the upstream side of the rotation imparting means in order to rotate previously each container stand at a relatively low speed.

2. A container rotating-transporting device as set forth in claim 1, wherein the rotation imparting means comprises a travelling belt moving along a path of each container stand.

3. A container rotating-transporting device as set forth in claim 2, wherein the moving direction of the transport means is the same as that of the travelling belt and a moving velocity of the transport means is different from that of the travelling belt.

4. A container rotating-transporting device as set forth in claim 2, wherein a velocity of the travelling belt is variable.

5. A container rotating-transporting device as set forth in claim 2, wherein the travelling belt is polygonal in cross section and each rotating body means which is brought into contact with the travelling belt is formed with a groove whose cross section is the same as the cross section of the travelling belt.

6. A container rotating-transporting device as set forth in claim 2, wherein each container stand is directly connected to each rotating body.

7. A container rotating-transporting device as set forth in claim 1, wherein the previous rotation imparting means comprises a pulley contacting each rotating body means.

8. A container rotating-transporting device as set forth in claim 1 further comprising rotary means for receiving said containers and for guiding said containers to said transport means.

* * * * *